US012656099B2

(12) United States Patent
Balogh et al.

(10) Patent No.: US 12,656,099 B2
(45) Date of Patent: Jun. 16, 2026

(54) MAGNETIC FORCE DILATOMETER WITH TEMPERATURE COMPENSATION

(71) Applicant: GM GLOBAL TECHNOLOGY OPERATIONS LLC, Detroit, MI (US)

(72) Inventors: Michael P. Balogh, Novi, MI (US); Andrew J. Galant, Shelby Township, MI (US); William Osad, Macomb, MI (US); Ratandeep Singh Kukreja, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 444 days.

(21) Appl. No.: 18/305,075

(22) Filed: Apr. 21, 2023

(65) Prior Publication Data

US 2024/0353216 A1　　Oct. 24, 2024

(51) Int. Cl.
| | |
|---|---|
| *H01M 10/48* | (2006.01) |
| *G01B 7/14* | (2006.01) |
| *G01B 7/24* | (2006.01) |
| *H01M 10/42* | (2006.01) |

(52) U.S. Cl.
CPC ..................................... *G01B 7/14* (2013.01)

(58) Field of Classification Search
CPC ..... G01B 7/24; G01R 31/382; H01M 50/109; H01M 10/48
See application file for complete search history.

(56) References Cited

U.S. PATENT DOCUMENTS

| | | | |
|---|---|---|---|
| 10,312,555 B2 | 6/2019 | Fukuda et al. | |
| 10,656,233 B2 | 5/2020 | Morrison et al. | |
| 2014/0370361 A1* | 12/2014 | Cheong ............. | H01M 10/0567 429/144 |
| 2016/0064780 A1* | 3/2016 | Jarvis ................ | H01M 10/4257 429/61 |
| 2017/0077561 A1* | 3/2017 | Fukuda .............. | H01M 10/482 |

(Continued)

FOREIGN PATENT DOCUMENTS

| | | |
|---|---|---|
| DE | 102017215144 A1 | 2/2019 |
| DE | 112018007256 T5 | 11/2020 |

(Continued)

OTHER PUBLICATIONS

Machine Translation of EP-3933956-A1 (Jun. 24, 2025) (Year: 2025).*

(Continued)

*Primary Examiner* — Matthew J Merkling

(57) ABSTRACT

A dilatometer for measuring battery dilation includes a battery cell, a magnet, and a magnetic force sensor. One of the magnet and the magnetic force sensor moves in response to expansion of the battery cell during dilation of the battery cell and the other of the magnet and the magnetic force sensor is stationary relative to the battery cell. The magnetic force sensor is configured to sense a change in magnetic force strength between the magnet and the magnetic force sensor. A sensor is configured to sense one of temperature and strain. A controller is configured to measure dilation of the battery cell based on the change in the magnetic force strength between the magnet and the magnetic force sensor and to compensate the dilation of the battery cell in response to the one of the temperature and the strain.

17 Claims, 13 Drawing Sheets

(56)               References Cited

U.S. PATENT DOCUMENTS

2017/0092997 A1 *   3/2017  Fukuda ................... G01B 7/24
2018/0156605 A1      6/2018  Swallow et al.
2020/0333376 A1     10/2020  Graf et al.

FOREIGN PATENT DOCUMENTS

DE      102021202154  A1      9/2022
DE      102021212386  A1      5/2023
DE      102022106393  A1      9/2023
DE      102023120823  A1      6/2024
EP          3933956  A1  *   1/2022
KR       20080109121  A   *  12/2008   .......... H01M 10/425

OTHER PUBLICATIONS

Machine Translation of EP-3933956-A1 (Jun. 25, 2025) (Year: 2025).*
German Office Action from counterpart DE1020241038926, dated Aug. 27, 2024.
German Office Action from counterpart DE1020241008180, dated Aug. 27, 2024.
U.S. Appl. No. 18/087,452, filed Dec. 22, 2022, Balogh et al.

* cited by examiner 410  414  436  440  424

450

400

410  414  418  422  424

MAGNETIC FORCE DILATOMETER WITH TEMPERATURE COMPENSATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for measuring battery dilation, and more particularly to systems and methods for measuring battery dilation with temperature compensation.

A battery pack includes one or more battery modules each including a plurality of battery cells. The battery cells experience dilation as the battery is charged and discharged. As the battery cells charge and discharge, chemical reactions inside the battery cells cause anode or cathode electrodes to expand or dilate and to contract. Monitoring dilation of the battery cells is useful for avoiding electrode dry out, improving battery cell life, engineering battery cells, estimating energy density, and/or designing battery modules and battery packs.

SUMMARY

A dilatometer for measuring battery dilation includes a battery cell, a magnet, and a magnetic force sensor. One of the magnet and the magnetic force sensor moves in response to expansion of the battery cell during dilation of the battery cell and the other of the magnet and the magnetic force sensor is stationary relative to the battery cell. The magnetic force sensor is configured to sense a change in magnetic force strength between the magnet and the magnetic force sensor. A sensor is configured to sense one of temperature and strain. A controller is configured to measure dilation of the battery cell based on the change in the magnetic force strength between the magnet and the magnetic force sensor and to compensate the dilation of the battery cell in response to the one of the temperature and the strain.

In other features, the battery cell includes a coin cell including a housing. The housing encloses a first electrode, a second electrode, and a separator arranged between the first electrode and the second electrode. The magnet is arranged adjacent to the second electrode and configured to move away from the magnetic force sensor as at least one of the first electrode and the second electrode expands during dilation. A biasing member is arranged between the magnet and an inner surface of the housing. The biasing member holds the magnet against the second electrode and is flexible to accommodate movement of the magnet as at least one of the first electrode and the second electrode expands during dilation. The magnetic force sensor is arranged external to the housing.

In other features, the magnetic force sensor includes one of a spherical magnet, a hemispherical magnet, and a conical magnet. The magnetic force sensor further includes one of a load sensor, a strain gauge, a pressure sensor, and an electromagnetic force restoration sensor. The magnetic force sensor includes one of a Hall sensor, a magnetoresistor, a fluxgate sensor, a superconducting quantum interference device (SQUID) sensor, a resonant sensor, an induction magnetometer, a reed contact sensor, and Wiegand wire sensor. The battery cell is a pouch cell. The battery cell is a prismatic cell.

A dilatometer for measuring dilation in a coin cell battery includes a coin cell holder configured to hold the coin cell battery. A magnet is arranged adjacent to the coin cell holder and spaced from the coin cell battery seated in the coin cell holder. A force sensor is configured to measure magnetic force strength between the magnet and a magnetic spacer arranged in the coin cell battery. A sensor is configured to measure one of temperature and strain of a component of the dilatometer. A translation stage is configured to support the force sensor. A controller is configured to measure dilation of the coin cell battery based on change in the magnetic force strength measured by the force sensor between the magnet and the magnetic spacer and to compensate the dilation based on the one of the temperature and the strain.

In other features, the magnet is one of a spherical magnet, a hemispherical magnet, and a conical magnet. The force sensor includes one of a load cell, a strain gauge, and a pressure sensor. The coin cell holder is configured to hold the coin cell battery during at least one of charging and discharging of the coin cell battery. The controller is configured to measure dilation of the coin cell battery with temperature compensation during the at least one of charging and discharging of the coin cell battery. A micrometer configured to adjust a height of the translation stage, which adjusts position of the magnet relative to the coin cell battery. The sensor is one of arranged on the translation stage and embedded in the translation stage.

A dilatometer for measuring dilation in a coin cell battery includes a housing of the coin cell battery, a first electrode within the housing, a second electrode within the housing, and a separator in the housing between the first electrode and the second electrode. A magnetic spacer is arranged in the housing adjacent to the second electrode. A biasing member is arranged in the housing between the magnetic spacer and an inner surface of the housing and is configured to hold the magnetic spacer against the second electrode. An external magnet is arranged outside of the housing and spaced from the housing. A first sensor is configured to measure magnetic force strength between the external magnet and the magnetic spacer. A second sensor is configured to sense one of temperature and strain of a component of the dilatometer. A controller is configured to measure dilation of the coin cell battery based on change in the magnetic force strength measured by the first sensor between the external magnet and the magnetic spacer and to compensate the dilation based on the one of the temperature and strain.

In other features, the external magnet is one of a spherical magnet, a hemispherical magnet, and a conical magnet. The sensor is a force sensor. The force sensor includes one of a load cell, a strain gauge, and a pressure sensor. The sensor and the external magnet are selected from a group consisting of a Hall sensor, a magnetoresistor, a fluxgate sensor, a superconducting quantum interference device (SQUID) sensor, a resonant sensor, an induction magnetometer, a reed contact sensor, a Wiegand wire sensor, and a magnetic force sensor. The magnetic spacer includes a ferritic stainless steel magnet or a permanent magnet. The controller is configured to measure the dilation of the coin cell battery during at least one of charging and discharging of the coin cell battery.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Battery cells such as lithium-ion batteries (LIBs) experience reversible and irreversible expansion or dilation during cycling. Accurately understanding battery cell expansion or dilation can be used to avoid electrode dry out, improve battery cell life, engineer battery cells, estimate energy density, and/or design a battery pack. For next generation anode materials such as silicon, battery cell expansion or dilation is a much bigger concern since some electrode materials experience ~300% volume change during cycling.

The present disclosure relates to a magnetic force dilatometer (MFD) configured to measure battery cell dilation during cycling. In commonly assigned U.S. patent application Ser. No. 18/087,452, filed on Dec. 22, 2022, and entitled, "SYSTEMS AND METHODS FOR MEASURING BATTERY DILATION", which is hereby incorporated by reference in its entirety, an MFD is configured to measure dilation of battery cells during cycling.

To ensure accuracy, measurements made using the MFD are performed in a thermal chamber. Thermal expansion of a test stand or mounting surface of the MFD causes approximately 2.5 μm/° C. position change. As a result, dilation measurements of battery cells at different or varying temperatures are not comparable. To alleviate this issue, the MFD is arranged in a thermal chamber that provides a controlled thermal environment. Most thermal chambers are able to control temperature to within +/−0.1° C., which corresponds to +/−0.25 μm accuracy in the dilation measurement. However, thermal chambers are expensive to purchase and/or operate and may or may not be available when needed.

An MFD according to the present disclosure includes at least one of a temperature sensor to measure temperature changes of one or more components (e.g., the test stand) of the MFD and/or a strain gage to measure strain of one or more components (e.g., the test stand) of the MFD. As can be appreciated, strain of a material is a function of temperature. Therefore, temperature can be inferred from the strain measurement.

Correcting for temperature reduces drift due to thermal expansion. Correcting for temperature also permits the MFD to be utilized outside of a temperature-controlled thermal chamber. In addition, temperature compensation allows dilation data to be collected while changing environmental temperature.

Figure 1A:
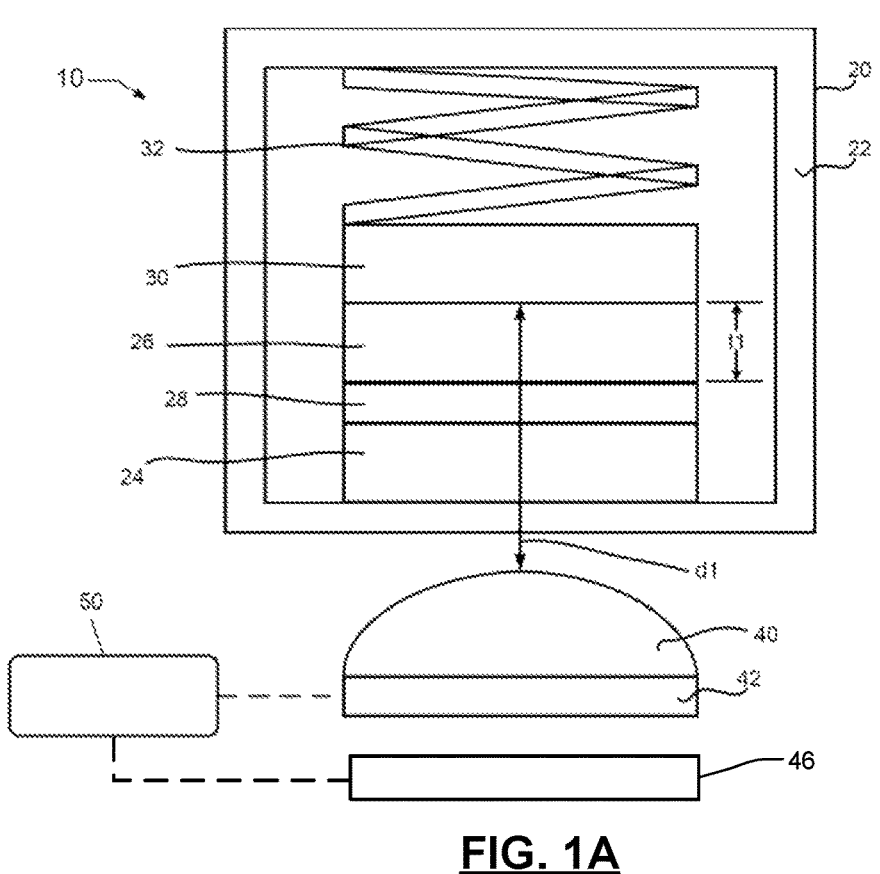
FIGS. 1A and 1B are side views of an example of a magnetic force dilatometer (MFD) for measuring dilation of a battery cell with temperature compensation according to the present disclosure.
Figure 1B:
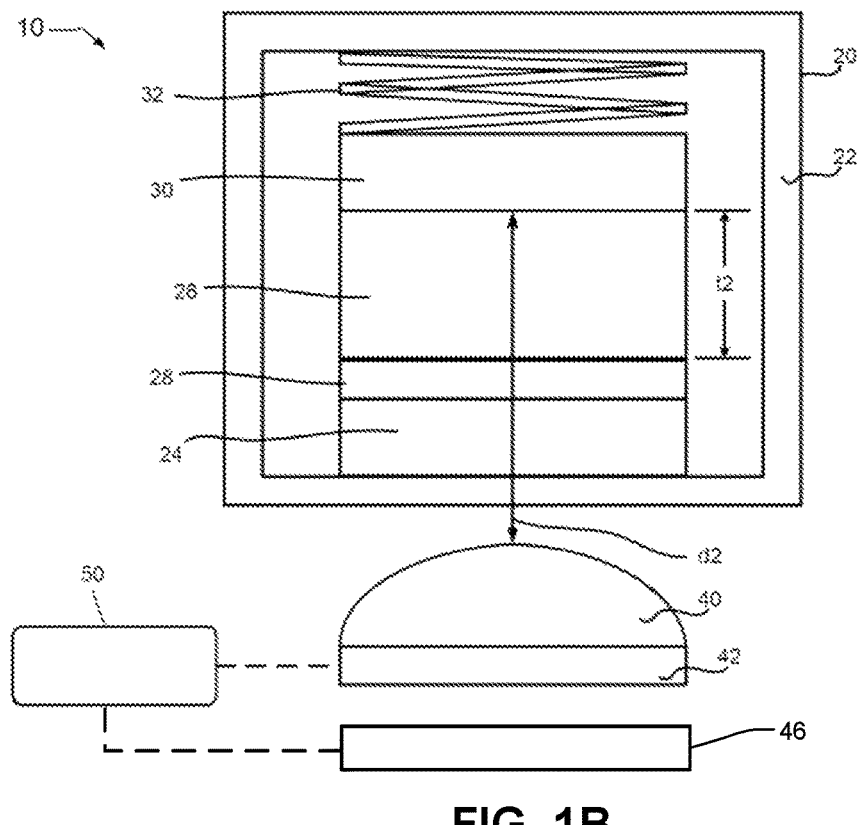

Referring now to FIGS. 1A and 1B, an MFD 10 for measuring battery dilation is shown. The MFD 10 includes a battery cell 20 (e.g., a lithium ion battery cell). The battery cell 20 includes a housing 22 enclosing one or more sets of first electrodes 24, second electrodes 26, and separators 28. A magnetic spacer 30 is arranged adjacent to the second electrode 26. The magnetic spacer 30 (e.g., a permanent magnet, an electromagnet, or a ferromagnetic material) is arranged to move within the housing 22 as the first electrode 24 or the second electrode 26 expands during dilation of the battery cell 20.

A biasing member 32 (e.g., a spring) is arranged between the magnetic spacer 30 and an inner surface of the housing 22. The biasing member 32 holds the magnetic spacer 30 against the second electrode 26, and is flexible to accommodate movement of the magnetic spacer 30 as the first electrode 24 and/or the second electrode 26 expand during dilation.

The MFD 10 further includes an external magnet 40, which is arranged outside of the housing 22 of the battery cell 20 and spaced from the housing 22. The external magnet 40 may be a hemispherical magnet, a spherical magnet, a conical magnet, a cylindrical magnet, a square magnet, a rectangular magnet, or any other suitable magnet. The external magnet 40 and the magnetic spacer 30 are arranged within each other's magnetic fields.

The MFD 10 also includes a sensor 42 configured to measure magnetic force strength between the external magnet 40 and the magnetic spacer 30. The sensor 42 may be any suitable force sensor, such as a load cell sensor, a strain gauge sensor, a pressure sensor, etc. In some applications, the external magnet 40 and the sensor 42 may be replaced with a Hall sensor, a magnetoresistor, a fluxgate sensor, a superconducting quantum interference device (SQUID) sensor, a resonant sensor, an induction magnetometer, a reed contact sensor, a Wiegand wire sensor, or a magnetic force sensor.

A temperature sensor 46 measures a temperature of a component of the MFD 10 or an environmental temperature surrounding the MFD 10. A controller 50 communicates with the sensor 42 and the temperature sensor 46. The controller 50 is configured to determine dilation of the battery cell 20 based on changes in the magnetic force strength between the external magnet 40 and the magnetic spacer 30. The controller 50 receives the temperature signal from the temperature sensor 46 and performs temperature correction or compensation of the measured dilation based on the temperature sensed by the temperature sensor 46.

For example, the change in dilation occurs in response to expansion of either the first electrode 24 and/or the second electrode 26 and/or due to variations in temperature during the dilation measurement. Expansion or dilation causes movement of the magnetic spacer 30 relative to the external magnet 40. However, the dilation measurement is affected by temperature. In other words, measurement of dilation of the battery cell at one temperature will be different than measurement of dilation of the battery cell at another temperature. The controller 50 compensates the dilation measurements based on the measured temperature.

In FIG. 1A, the battery cell 20 is shown in a non-dilated state with the external magnet 40 spaced from the magnetic spacer 30 at a distance d1. The second electrode 26 has a thickness t1. In FIG. 1B, the battery cell 20 is shown in a dilated state. The thickness of the second electrode 26 increased from t1 to t2. As the second electrode 26 (and/or the first electrode 24) increases in thickness, the magnetic spacer 30 moves further away from the external magnet 40. For example, in the non-dilated state of FIG. 1A, the magnetic spacer 30 is arranged at a distance d1 from the external magnet 40. In the dilated state of FIG. 1B, the second electrode 26 is arranged at a distance d2 from the external magnet 40, which is greater than the distance d1. At distance d2, the magnetic attraction between the external magnet 40 and the magnetic spacer 30 is less than at distance d1.

In some examples, the controller 50 uses one or more formulas relating dilation to the load cell measurement and/or temperature. In other examples, the controller 50 includes memory storing a first calibration table storing dilation as a function of the load cell measurement and a second calibration table storing dilation compensation values as a function of temperature. The first calibration table includes the known magnetic force strength between the external magnet 40 and the magnetic spacer 30 at different distances d. The second calibration table stores dilation compensation values at different temperatures. In some examples, the first and second calibration tables are combined into a single table indexed by the load cell measurement and the measured temperature and/or strain, which is a function of temperature.

Using the first and/or second calibration tables, the controller 50 determines the distance d2 between external magnet 40 and the second electrode 26 corresponding to the magnetic strength measured by the sensor 42 as compensated based on the measured temperature. The distance d2 represents the dilation of the second electrode 26 (and/or the first electrode 24).

The dilation data can be used for a variety of different purposes. For example, knowing the degree to which the battery cell 20 has dilated after a particular number of charge/discharge cycles and/or under various conditions can be useful for designing batteries that are less susceptible to electrode dry out and have increased cell life. The information may also be used during engineering of the battery cells, estimating energy density, and designing various battery modules and packs. An exemplary calibration procedure is explained in further detail herein.

Figure 2:
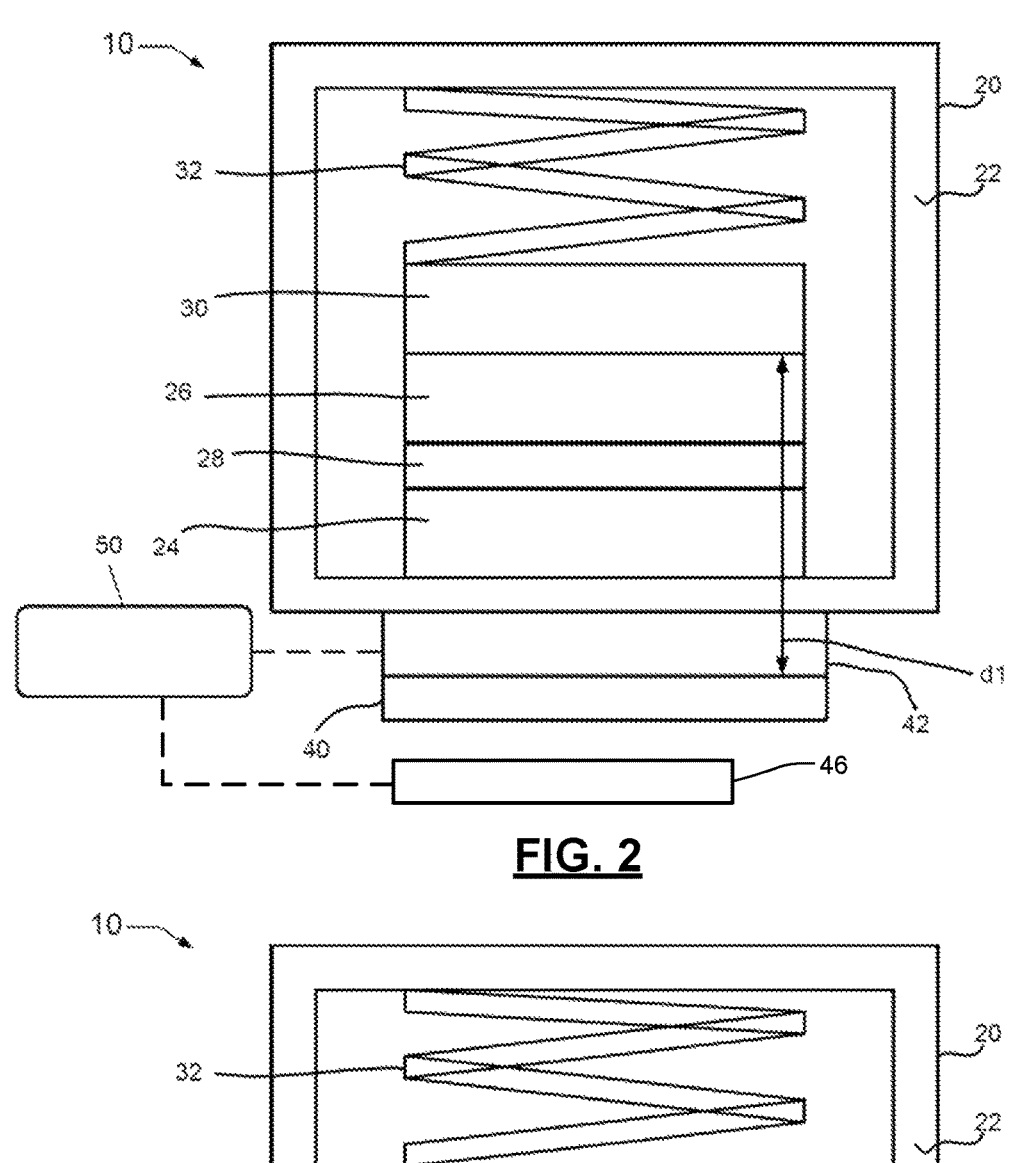
FIGS. 2 to 4 are side views of other examples of MFDs for measuring dilation of a battery cell with temperature compensation according to the present disclosure.

Referring now to FIG. 2, the sensor 42 is arranged between the external magnet 40 and the housing 22. The sensor 42 is in direct contact with the housing 22 and includes a pressure sensor.

Figure 3:
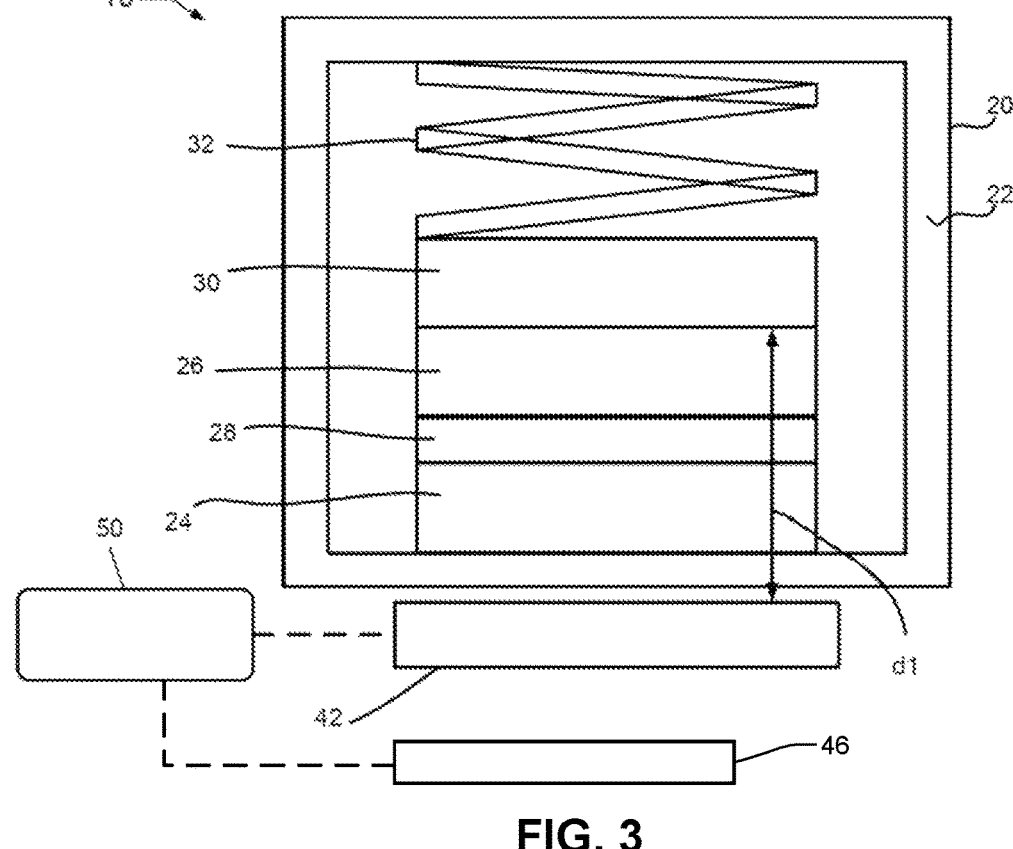
Figure 4:
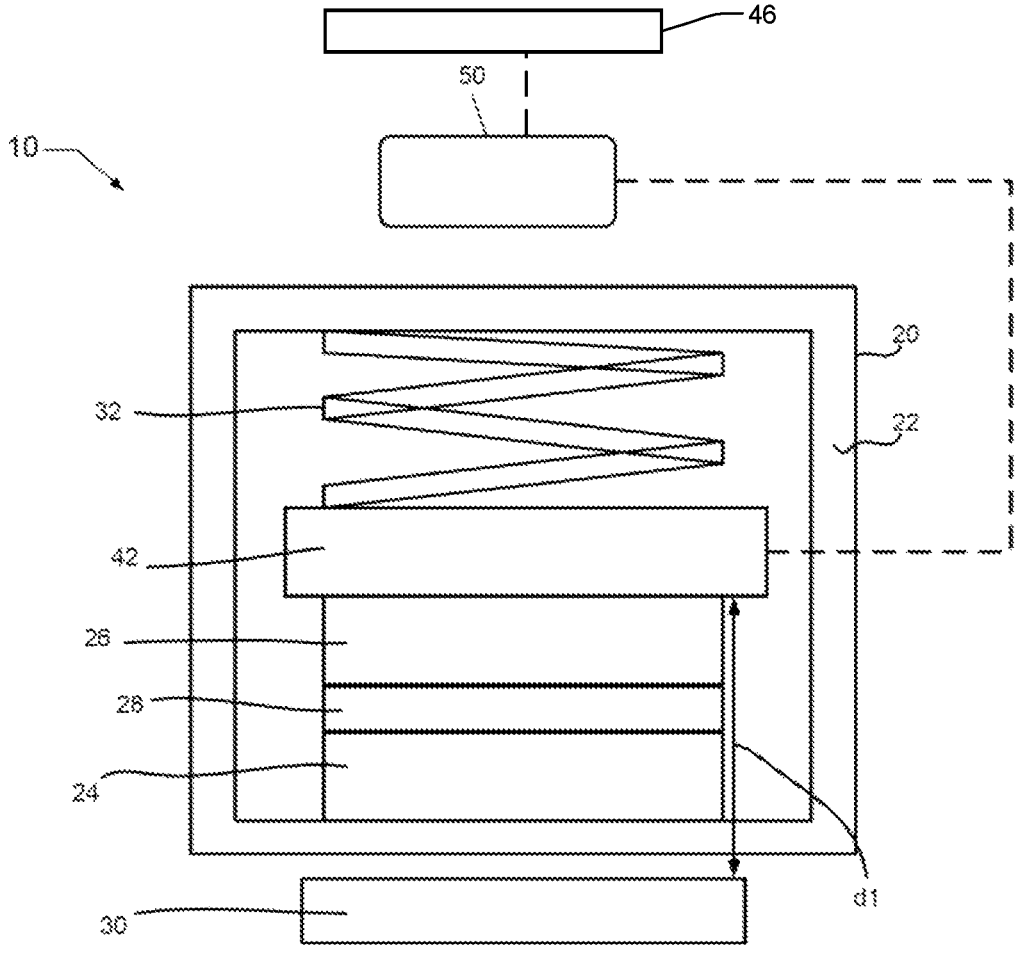

Referring now to FIGS. 3 and 4, the sensor 42 comprises a magnetic sensor. In some examples, the sensor 42 is selected from a group consisting of a Hall sensor, a magnetoresistor sensor, a fluxgate sensor, a sensor including a superconducting quantum interference device (SQUID), a resonant sensor, an induction magnetometer, a reed contact sensor, a Wiegand wire sensor, and/or a magnetic force sensor. The sensor 42 is spaced from the housing 22.

In FIG. 4, the positions of the sensor 42 and the magnetic spacer 30 are reversed. The sensor 42 is arranged within the housing 22 between the second electrode 26 and the biasing member 32, and the magnetic spacer 30 is arranged outside of the housing 22 spaced from or in contact with the housing 22.

Figure 5A:
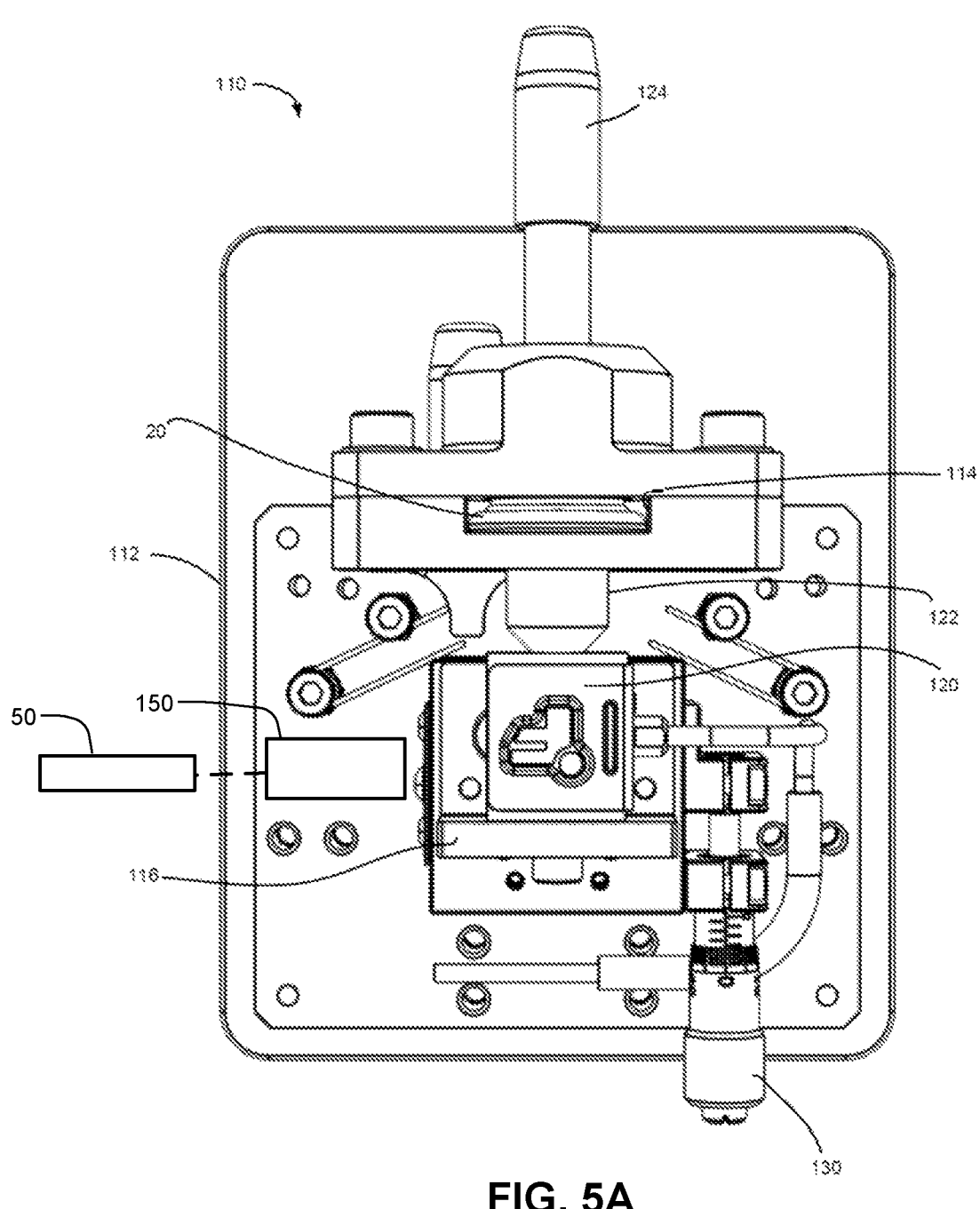
FIGS. 5A to 5C are plan views illustrating other examples of MFDs for measuring dilation of a battery cell with temperature compensation according to the present disclosure.

Referring now to FIGS. 5A-7, additional examples are shown. In FIG. 5A, a temperature sensor 150 is mounted on the battery cell holder 114 and is configured to measure temperature. The measured temperature is used to compensate the measured dilation for temperature variations. In some examples, a plurality of position values for the same battery cell, different battery cells, or battery cells with different chemistry are adjusted to a predetermined temperature so that results of the dilatometer measurements can be compared to one another.

Figure 5B:
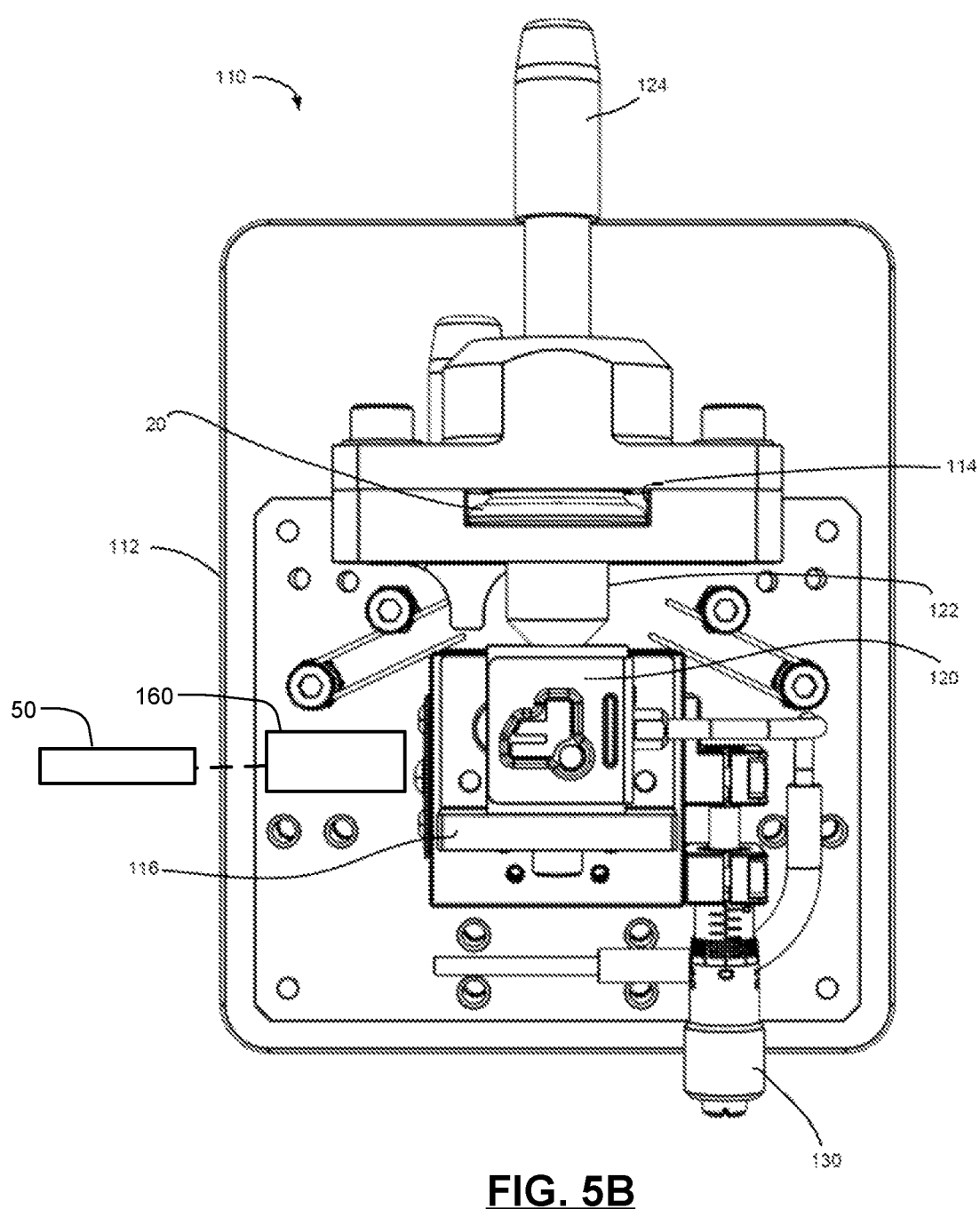
Figure 5C:
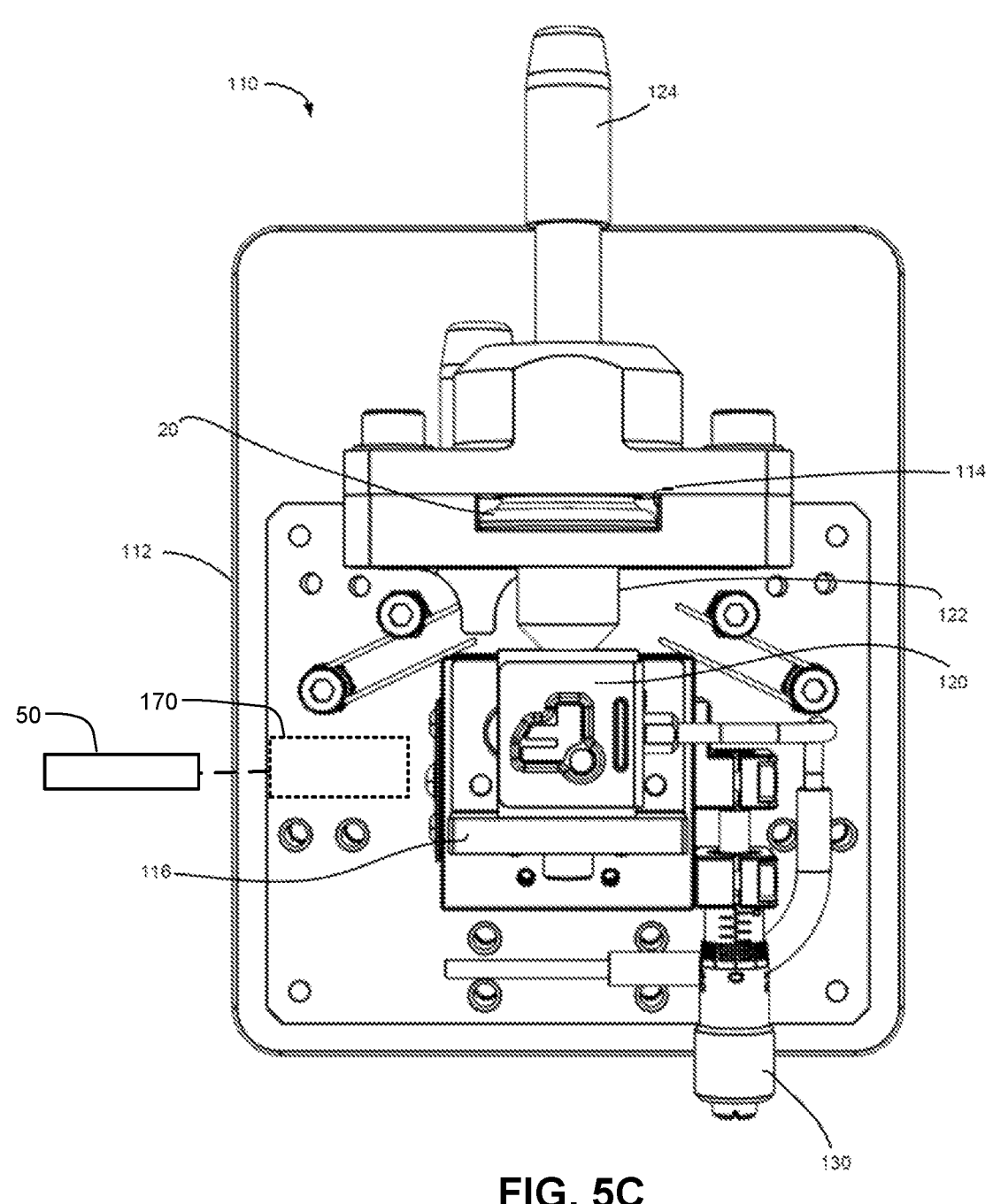
Figure 6:
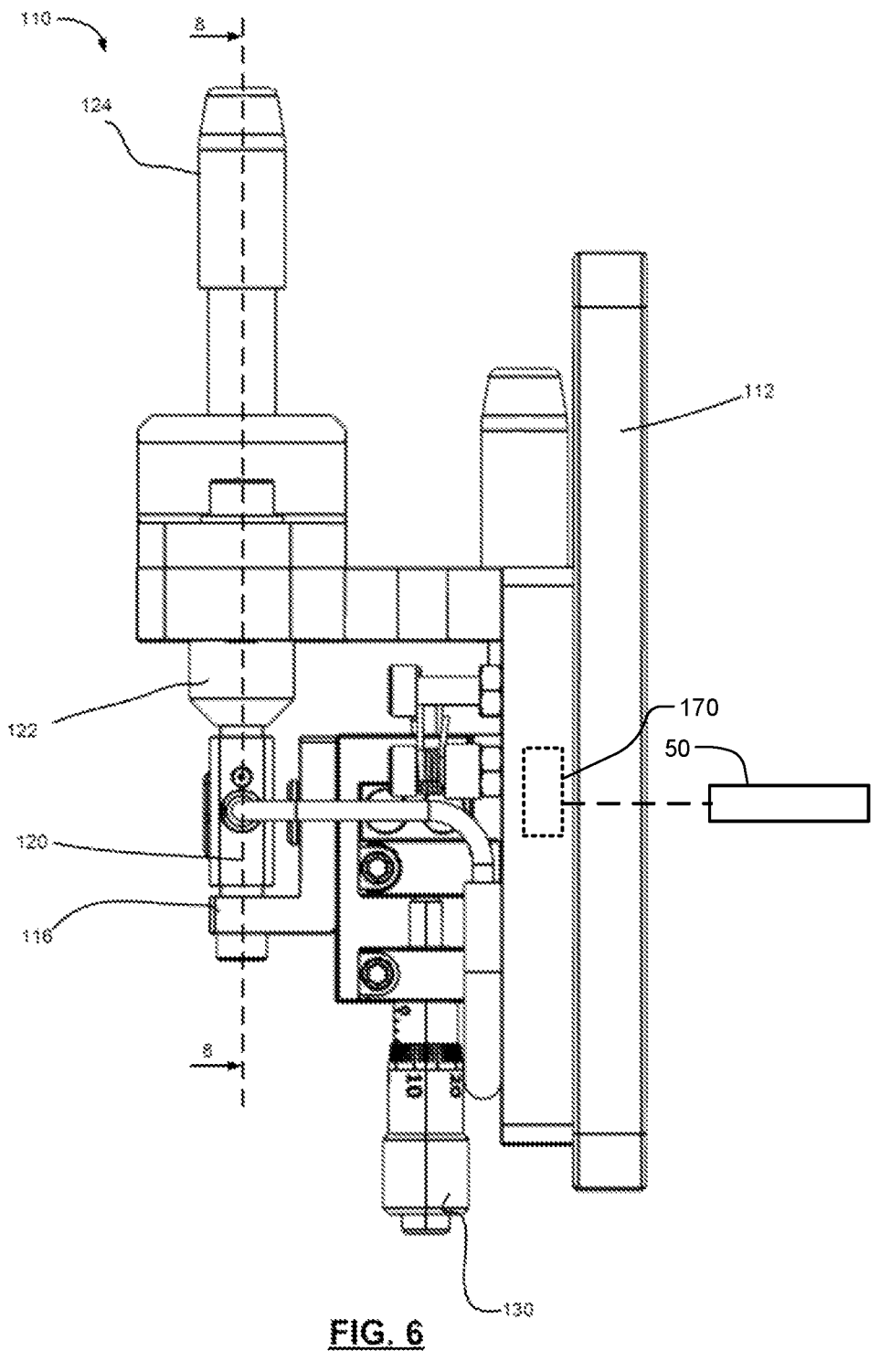
FIG. 6 is a side view of the MFD of FIG. 50.
Figure 7:
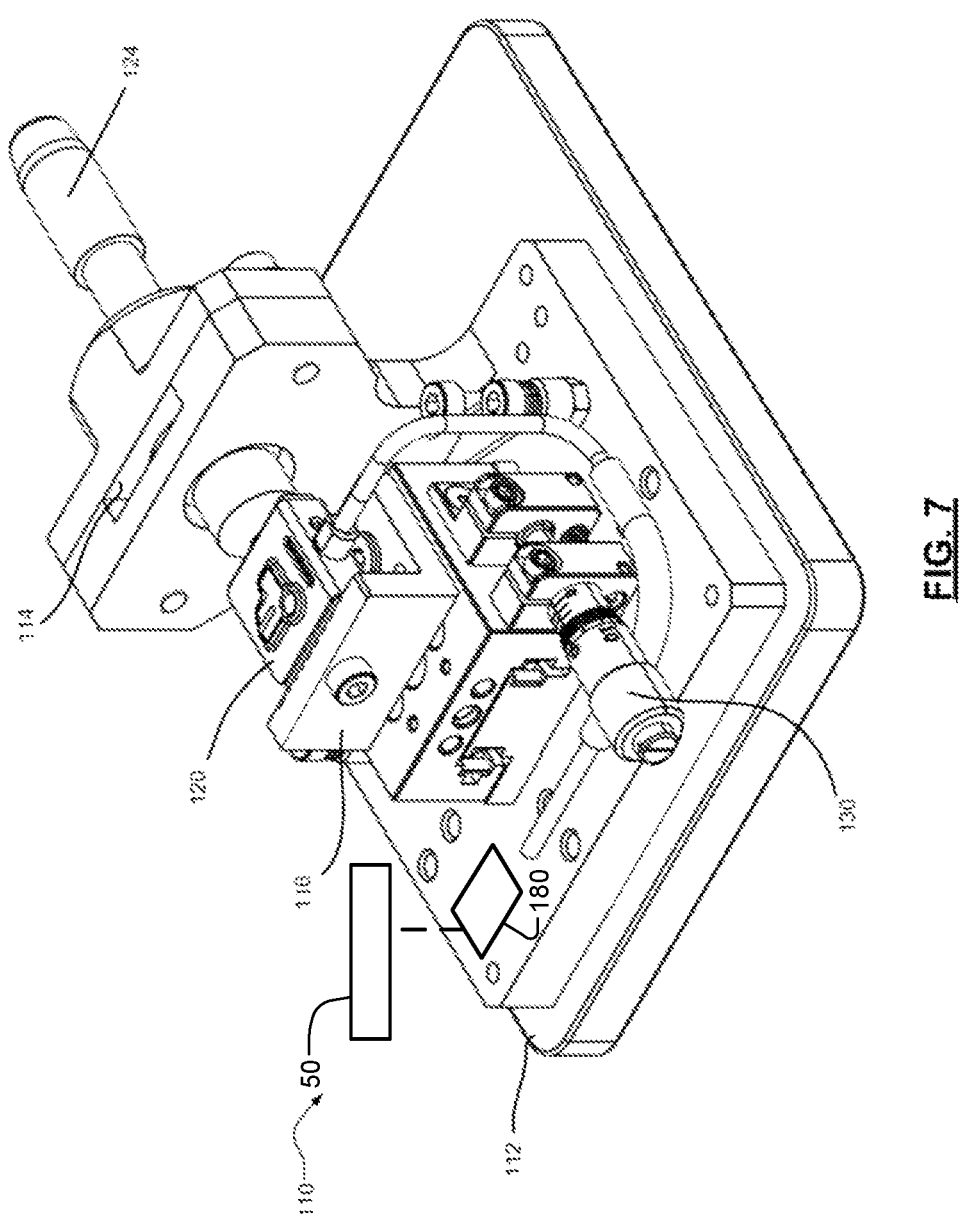
FIG. 7 is a perspective view of the MFD of FIGS. 5A and 5B.

In FIG. 5B, a strain sensor 160 is mounted on the battery cell holder 114 and is configured to measure strain. Since strain is a function of temperature, temperature can be inferred from the measured strain. The measured strain can be used directly to compensate the measured dilation for temperature variation. The measured strain can also be used to determine temperature which can then be used to compensate the measured dilation for temperature variations. In FIGS. 5C and 6, a temperature sensor 170 is mounted in a cavity or bore formed in battery cell holder 114 and/or another component of the MFD. In some examples, the temperature sensor 170 comprises a thermocouple. In FIG. 7, the sensor 180 is arranged on the MPD.

In FIGS. 5A to 7, a dilatometer 110 is configured to measure dilation with temperature compensation of any suitable battery cell as the battery cell is charged and discharged. For example, the dilatometer 110 is configured to measure real time dilation of the battery cell 20 of FIGS. 1A, 1B, 2, 3, and 4. The dilatometer 110 includes a stand 112 (e.g., base plate) and a battery cell holder 114 mounted to the stand 112.

The battery cell holder 114 is configured to hold a coin cell battery cell or other type of battery cell. Leads are connected to the battery cell 20 for charging and discharging the battery cell 20. A translation stage 116 is mounted to the battery cell holder 114 to support a load cell 120. The load cell 120 may be any suitable load cell, such as a Miniature S-Bear Jr. Load Cell 2.0 (Model LSB201) from Futek Advanced Sensor Technology, Inc. of Irvine, CA. The dilatometer 110 includes a micrometer 130 for adjusting the vertical height of the translation stage 116 and to adjust the vertical position of the load cell 120 arranged on the translation stage 116.

A magnet holder 122 is arranged on the load cell 120 and is configured to hold the external magnet 40. In this example, the external magnet 40 includes a spherical magnet. As can be appreciated, the magnet holder 122 can be configured to hold external magnets having other suitable shape. The battery cell 20 is supported in the battery cell holder 114 between the external magnet 40 and a compression member 124, which holds the battery cell 20 in place.

The dilatometer 110 may be used to calibrate the controller 50 and to establish the calibration tables described above.

For example, the calibration tables may be established as follows. Using the micrometer 130, the translation stage 116 is raised, which raises the external magnet 40. The translation stage 116 is raised until the magnetic strength measured by the load cell 120 between the external magnet 40 and the magnetic spacer 30 begins to drop.

The magnetic strength increases until the external magnet 40 touches the housing 22, at which point the magnetic strength reading begins to drop. The translation stage 116 is adjusted up or down until the force on the load cell 120 is maximized. Once the force on the load cell 120 is maximized, the controller 50 is configured to start recording the load cell data at any suitable intervals.

For example, the controller 50 can be configured to record one or two readings per second. The translation stage 116 is then lowered at least three times in 50 μm increments while recording a plurality of values (e.g., 5-10 per step adjustment). The translation stage 116 is raised back to the starting point in 50 μm increments while recording a plurality of values (e.g., 5-10 per step adjustment). The process can be repeated for other temperatures.

Figure 8:
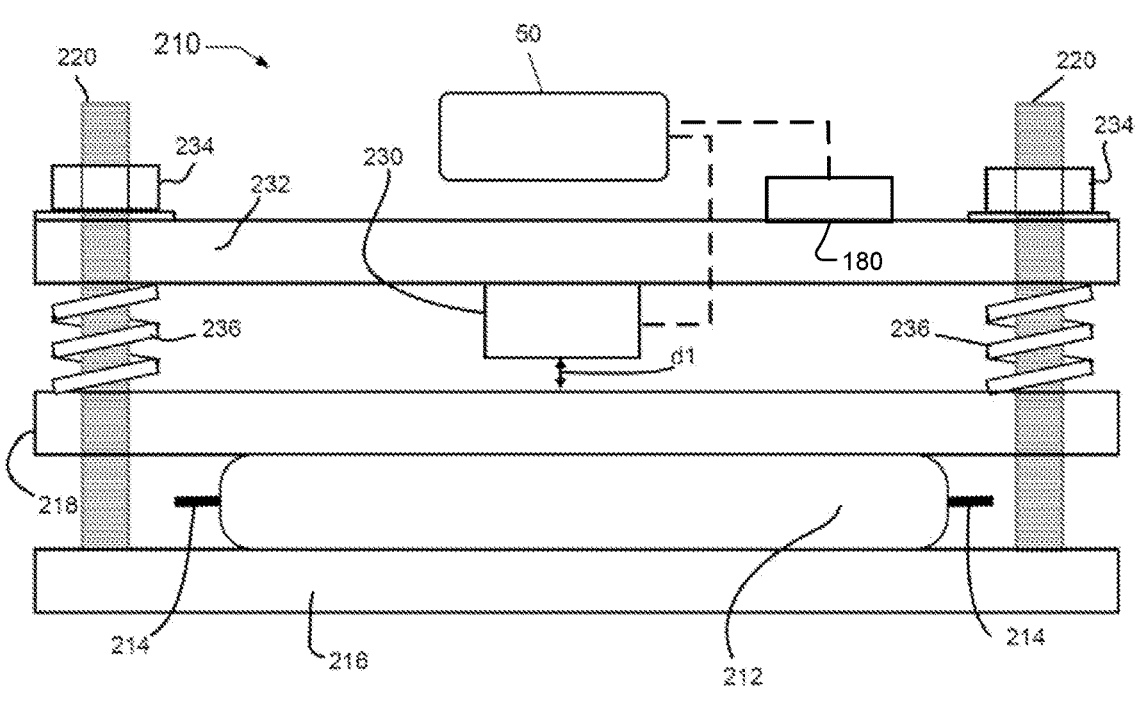
FIG. 8 is a side view of a MFD for measuring dilation of a pouch cell battery with temperature compensation according to the present disclosure.

Referring now to FIG. 8, a system 210 for measuring battery dilation of a pouch cell battery 212 is shown. The pouch cell battery 212 includes battery terminals 214 and is seated on a fixed plate 216. The pouch cell battery 212 is between the fixed plate 216 and a magnet in the form of a compression plate 218 that floats. The compression plate 218 may be made of any suitable magnetic material (e.g., steel), or have a magnet or magnetic material embedded in or attached to a surface of the compression plate 218. The compression plate 218 is arranged on supports 220. Opposite to the compression plate 218 is a sensor 230 configured to sense magnetic force, such as a magnetic field sensor or a load cell (e.g., the load cell 120). The sensor 230 is mounted to a fixed plate 232, and thus the sensor 230 is stationary. The sensor 230 is in communication with the controller 50. The fixed plate 232 is mounted to the supports 220 and fixed in position by fasteners 234. Between the fixed plate 232 and the compression plate 218 are springs 236 for accommodating movement of the compression plate 218 during dilation. A sensor 180 such as a temperature or strain sensor measures temperature or strain (and derives temperature based on strain).

As the pouch cell battery 212 expands during dilation, the distance d1 between the sensor 230 and the compression plate 218 decreases, and the strength of the magnetic field between the compression plate 218 and the sensor 230 changes. The controller 50 is configured to measure the degree of dilation of the pouch cell battery 212 based on the change in the magnetic force strength between the compression plate 218 and the sensor 230. The system 210 may be calibrated as explained above with respect to calibration of the battery cell 20, but modified to account for the distance d1 decreasing during dilation instead of increasing. The system 210 may be calibrated in any other suitable manner that correlates a measured magnetic field strength between the compression plate 218 and the sensor 230 with a degree to which the pouch cell 212 has dilated.

Figure 9:
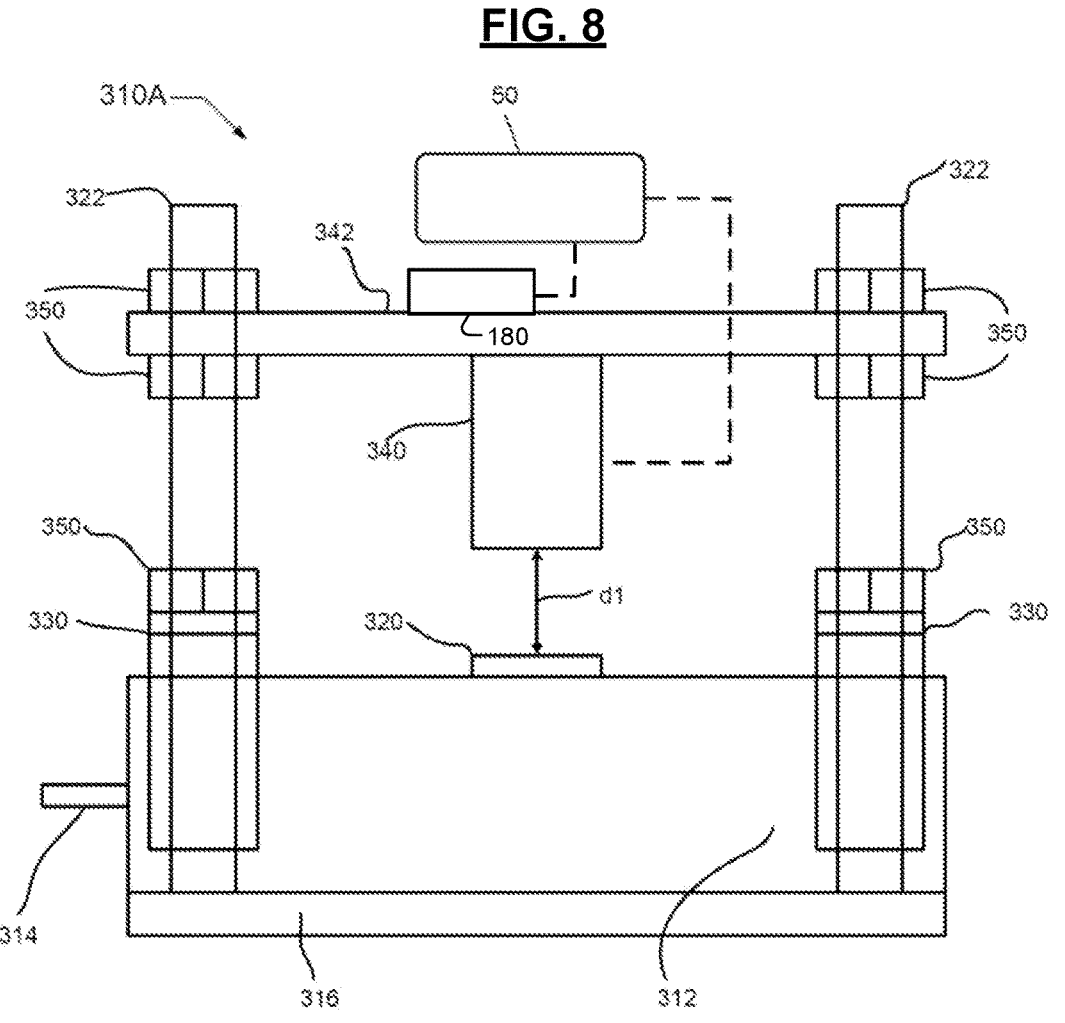
FIGS. 9 and 10 are side views of MFDs for measuring dilation of a prismatic cell battery with temperature compensation according to the present disclosure.

With reference to FIG. 9, a system 310A for measuring battery dilation of a prismatic cell battery 312 is shown. The prismatic cell battery 312 includes a battery terminal 314 and is mounted to a fixed plate 316. A magnet 320 is mounted to the prismatic cell battery 312. Supports 322 extend from the plate 316 including brackets 330. The brackets 330 hold the prismatic cell battery 312 against the plate 316. During dilation, the prismatic cell battery 312 expands such that the magnet 320 moves towards a sensor

340 mounted to a fixed plate 342. The fixed plate 342 is rigidly secured to the supports 322 with fasteners 350. The sensor 340 is in communication with the controller 50.

The sensor 340 is configured to sense magnetic force. The sensor 340 may include a magnetic field sensor or a load cell (e.g., the load cell 120), for example. As the prismatic cell battery 312 expands during dilation, the distance d1 between the magnet 320 and the sensor 340 decreases, and the strength of the magnetic field between magnet 320 and the sensor 340 changes. The controller 50 is configured to measure the degree of dilation of the prismatic cell battery 312 based on the change in the magnetic force strength between the magnet 320 and the sensor 340.

The system 310A is first calibrated and then modified to account for the distance d1 decreasing during dilation instead of increasing. The system 310A may alternatively be calibrated in any other suitable manner that correlates a measured magnetic field strength between the magnet 320 and the sensor 340 with a degree to which the prismatic cell battery 312 has dilated.

Figure 10:
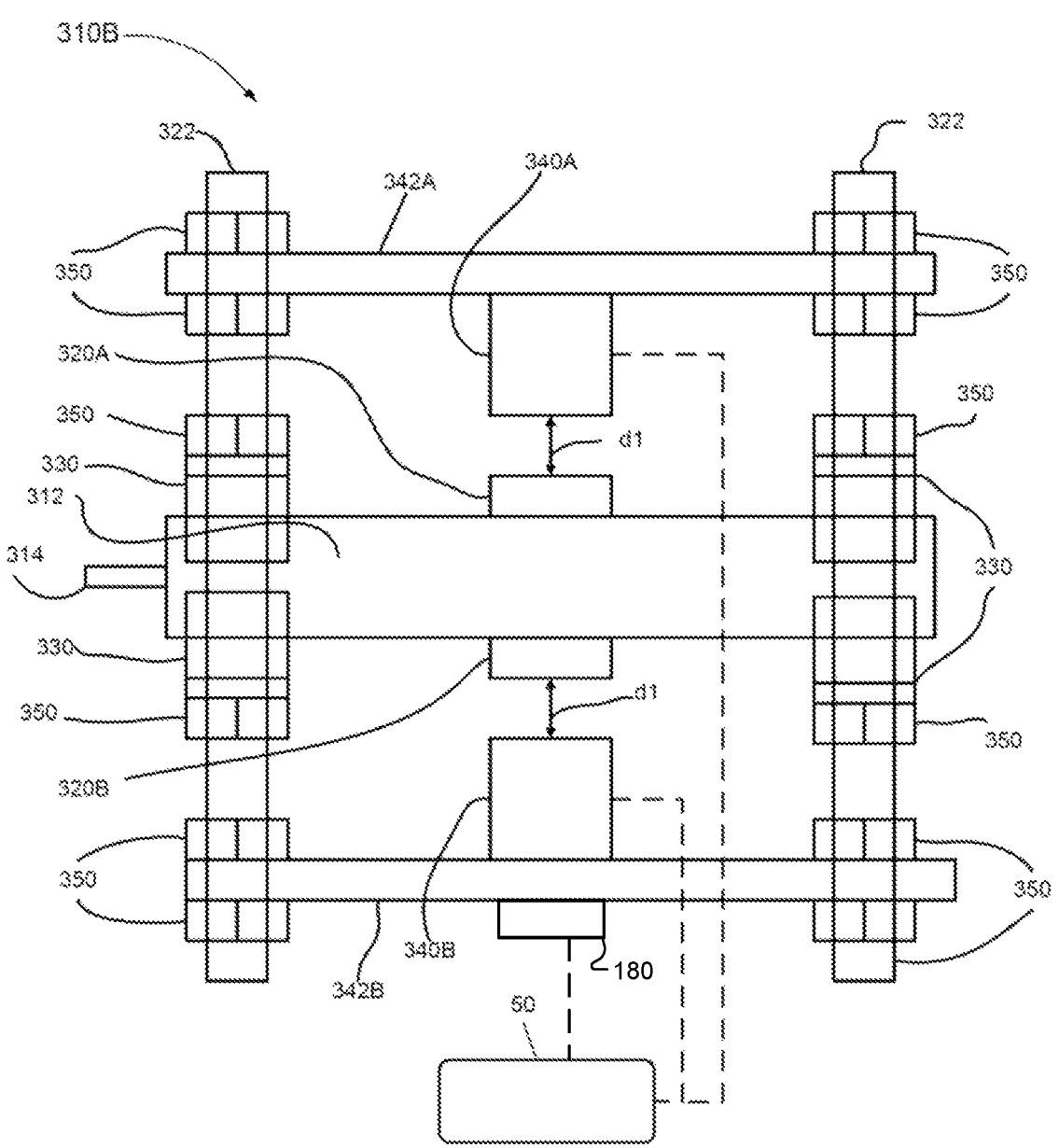

The system 310B of FIG. 10 is similar to the system 310A of FIG. 9. In the system 310B, the prismatic cell battery 312 is mounted so that during dilation the prismatic cell battery 312 is able to expand on two opposite sides, such as top and bottom sides (or front and rear sides). To measure expansion on the two sides, a magnet 320A is arranged on one side of the prismatic cell battery 312 and a magnet 320B is arranged on an opposite side. Opposite to the magnet 320A is a sensor 340A. Opposite to the magnet 320B is a sensor 340B. The sensor 340A measures changes in magnetic force strength with the magnet 320A. The sensor 340B measures changes in magnetic force strength with the magnet 320B.

The system 310B is initially calibrated and modified to account for the distances d1 decreasing during dilation instead of increasing. The system 310B may alternatively be calibrated in any other suitable manner that correlates measured magnetic field strength between the magnet 320A and the sensor 340A, and/or between the magnet 320B and the sensor 340B, with a degree to which the prismatic cell battery 312 has dilated.

Figure 11:
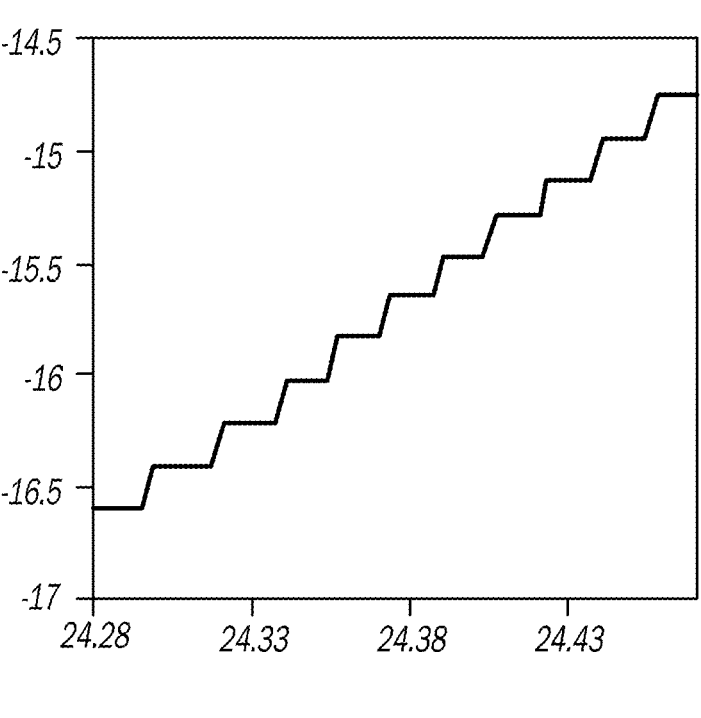
FIG. 11 is a graph illustrating a load cell measurement of an MFD as a function of time according to the present disclosure.
Figure 12:
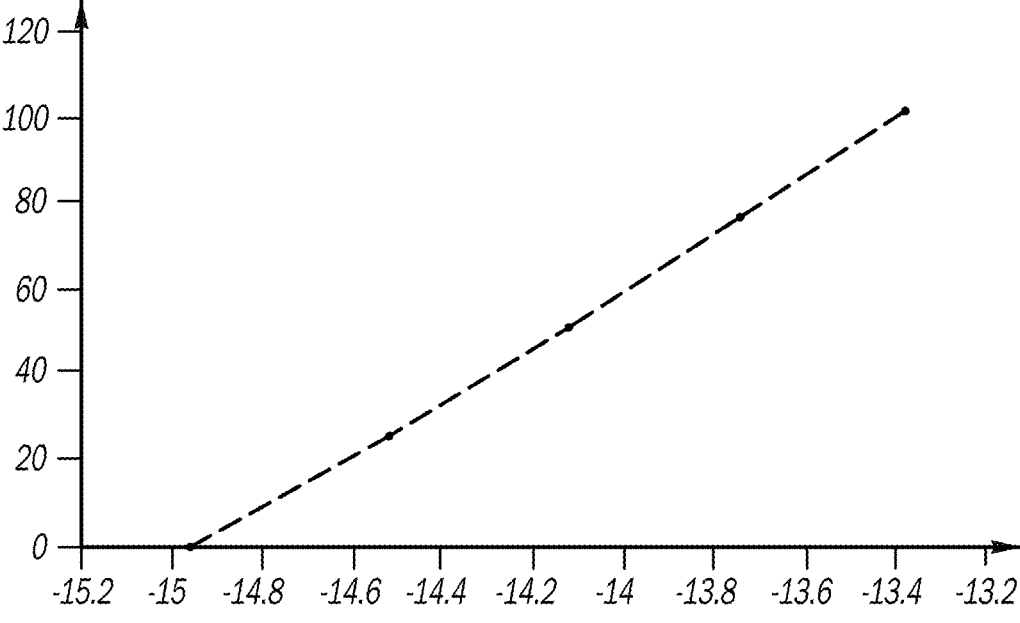
FIG. 12 is a graph illustrating dilation (in μm) as a function of the load cell signal according to the present disclosure.

Referring now to FIG. 11, an exemplary calibration recording in 10 μm steps is shown. The translation stage 116 is then lowered 50 μm, locked in place, and recording of the calibration data is stopped. The readings at each step of the translation stage 116 are averaged by the controller 50. The controller 50 plots translation as a function of the average load cell reading, and calculates the calibration curve and $R^2$ for the best fit mathematical function, such as a linear (e.g., $y=mx+b$) or a polynomial function (e.g., $y=ax^2+bx+c$) (with $R^2$ being greater than 0.99) (FIG. 12).

After calibration, the dilatometer 110 may be used to measure dilation of the battery cell 20, or any other suitable battery, as the battery cell 20 is run through charge and discharge cycles. Leads are connected to the dilatometer 110 for cycling the battery cell 20. The controller 50 is configured to record data from the load cell 120 at any suitable time increments, such as 5 second increments, for example.

Figure 13B:
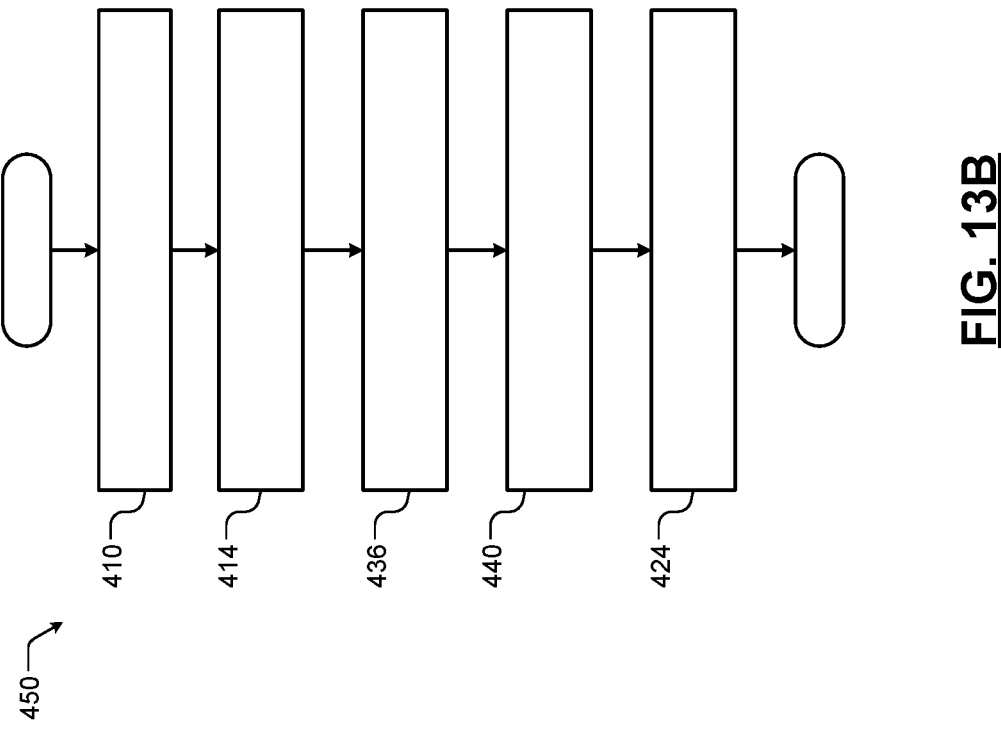
FIGS. 13A and 13B are flowcharts of examples of methods for measuring dilation of a battery cell with temperature compensation according to the present disclosure.
Figure 13A:
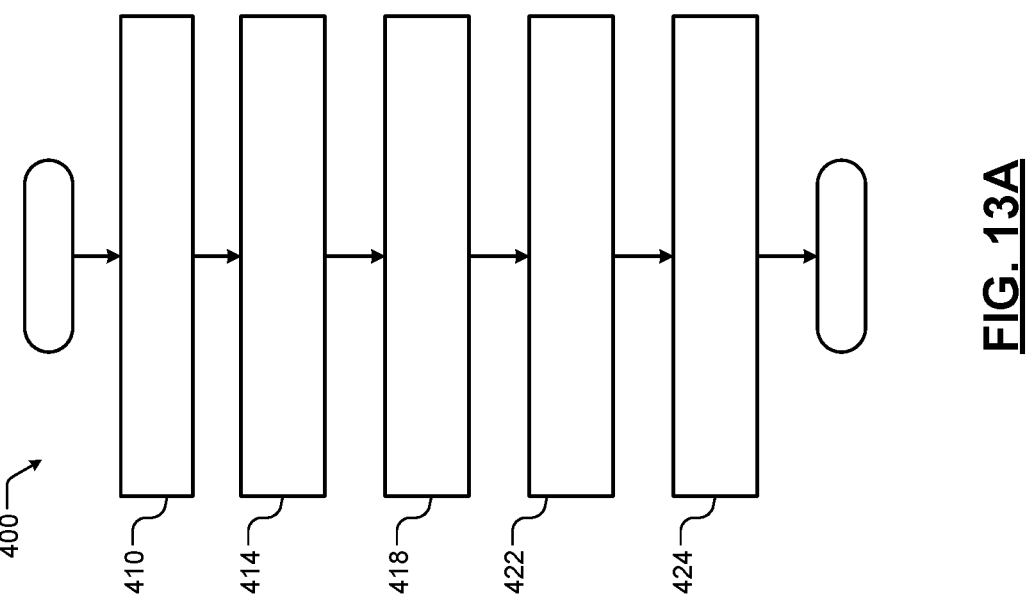

Referring now to FIGS. 13A and 13B, methods 400 and 450 for measuring dilation of a battery cell with temperature compensation is shown, respectively. In FIG. 13A, the load cell signal is measured at 410. At 414, position or dilation is determined based on the load cell signal. For example, a table including calibration data indexed by the load cell signal can be used. At 418, the temperature is measured. At 422, the method determines a temperature correction based on the sensed temperature. At 424, the position or dilation is adjusted using the temperature correction.

In FIG. 13B, strain is measured at 436. At 440, the temperature correction is determined based on the sensed strain.

Figure 15:
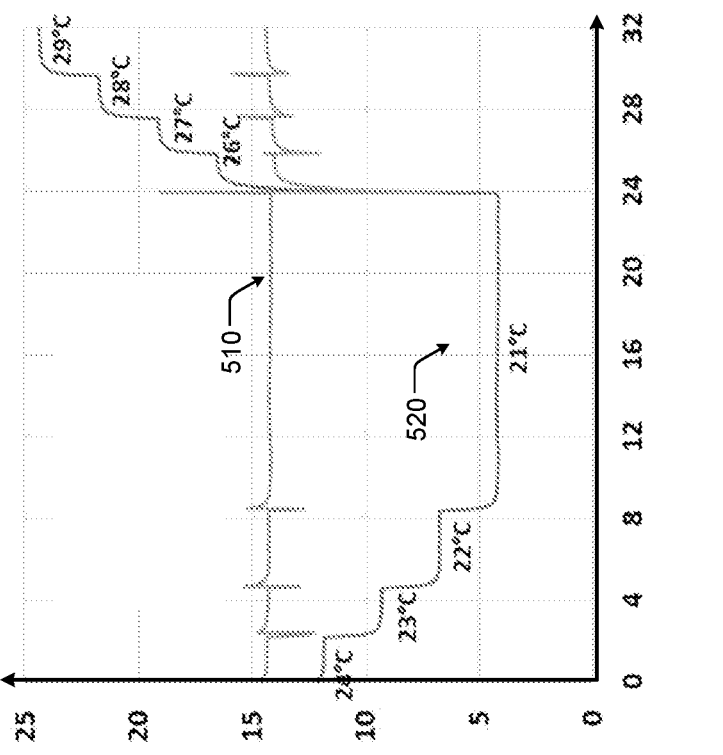
FIG. 15 is a graph illustrating position (in μm) as a function of time without temperature compensation and as a function of time with temperature compensation according to the present disclosure.
Figure 14:
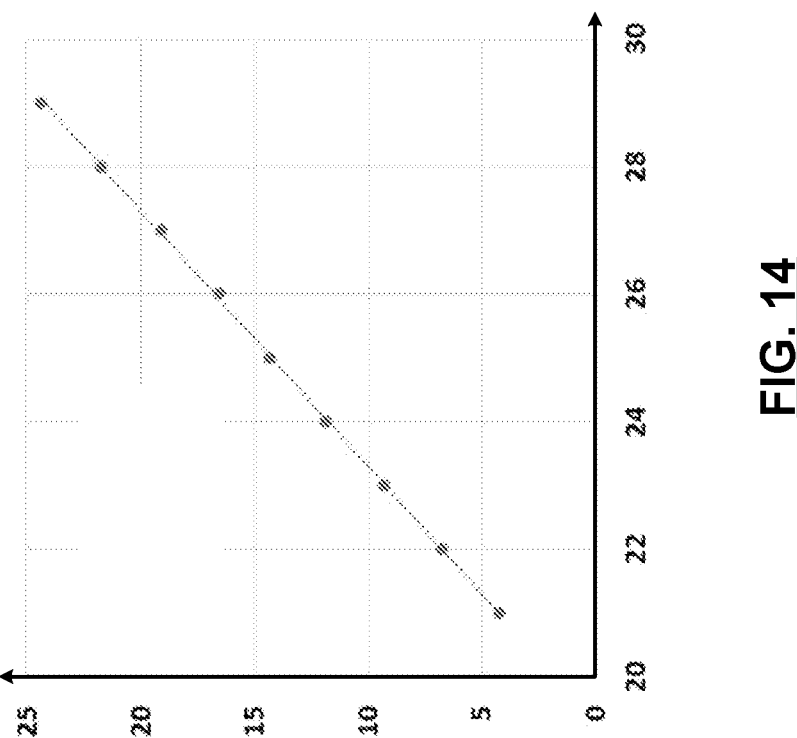
FIG. 14 is a graph illustrating position (in μm) as a function of temperature according to the present disclosure.

Referring now to FIGS. 14 and 15, graphs illustration operation of the dilatometer is shown. In FIG. 14, temperature calibration data is shown. Position is shown as a function of temperature. In FIG. 15, data is shown after temperature compensation at 510 and without temperature compensation at 520. Position is shown as a function of time. The measured temperature varies over time in a range from 21° C. to 29° C. The position value (which should remain stable assuming operating conditions stay the same) varies between ~4 μm and ~25 μm. With temperature calibration, the measured position remains relatively steady other than during brief period when the temperature transitions up or down.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A dilatometer for measuring battery dilation comprising:
a battery cell including a coin cell having a housing, the housing encloses a first electrode, a second electrode, and a separator arranged between the first electrode and the second electrode;
a magnet arranged adjacent to the second electrode;
a biasing member between the magnet and an inner surface of the housing,
wherein the biasing member holds the magnet against the second electrode and is flexible to accommodate movement of the magnet as at least one of the first electrode and the second electrode expands during dilation;
a magnetic force sensor external to the housing,
wherein the magnet is configured to move away from the magnetic force sensor as at least one of the first electrode and the second electrode expands during dilation of the battery cell, and the magnetic force sensor is configured to remain stationary relative to the battery cell,
wherein the magnetic force sensor is configured to sense a change in magnetic force strength between the magnet and the magnetic force sensor; and
a sensor configured to sense one of temperature and strain; and
a controller configured to measure dilation of the battery cell based on the change in the magnetic force strength between the magnet and the magnetic force sensor and to compensate the dilation of the battery cell in response to the one of the temperature and the strain.

2. The dilatometer of claim 1, wherein the magnetic force sensor includes one of a spherical magnet, a hemispherical magnet, and a conical magnet.

3. The dilatometer of claim 2, wherein the magnetic force sensor further includes one of a load sensor, a strain gauge, a pressure sensor, and an electromagnetic force restoration sensor.

4. The dilatometer of claim 1, wherein the magnetic force sensor includes one of a Hall sensor, a magnetoresistive sensor, a fluxgate sensor, a superconducting quantum interference device (SQUID) sensor, a resonant sensor, an induction magnetometer, a reed contact sensor, and a Wiegand wire sensor.

5. A dilatometer for measuring dilation in a coin cell battery comprising:
a coin cell holder configured to hold the coin cell battery;
a magnet arranged adjacent to the coin cell holder and spaced from the coin cell battery seated in the coin cell holder;
a force sensor configured to measure magnetic force strength between the magnet and a magnetic spacer arranged in the coin cell battery;
a sensor configured to measure one of temperature and strain of a component of the dilatometer;
a translation stage configured to support the force sensor; and
a controller configured to measure dilation of the coin cell battery based on change in the magnetic force strength measured by the force sensor between the magnet and the magnetic spacer and to compensate the dilation based on the one of the temperature and the strain.

6. The dilatometer of claim 5, wherein the magnet is one of a spherical magnet, a hemispherical magnet, and a conical magnet.

7. The dilatometer of claim 5, wherein the force sensor includes one of a load cell, a strain gauge, and a pressure sensor.

8. The dilatometer of claim 5, wherein:
the coin cell holder is configured to hold the coin cell battery during at least one of charging and discharging of the coin cell battery; and
wherein the controller is configured to measure dilation of the coin cell battery with temperature compensation during the at least one of charging and discharging of the coin cell battery.

9. The dilatometer of claim 5, further comprising a micrometer configured to adjust a height of the translation stage, which adjusts position of the magnet relative to the coin cell battery.

10. The dilatometer of claim 5, further comprising wherein the sensor is one of arranged on the translation stage and embedded in the translation stage.

11. A dilatometer for measuring dilation in a coin cell battery, the dilatometer comprising:
a housing of the coin cell battery;
a first electrode within the housing;
a second electrode within the housing;
a separator in the housing between the first electrode and the second electrode;
a magnetic spacer within the housing adjacent to the second electrode;
a biasing member arranged in the housing between the magnetic spacer and an inner surface of the housing and configured to hold the magnetic spacer against the second electrode;
an external magnet arranged outside of the housing and spaced from the housing;
a first sensor configured to measure magnetic force strength between the external magnet and the magnetic spacer;
a second sensor configured to sense one of temperature and strain of a component of the dilatometer; and
a controller configured to measure dilation of the coin cell battery based on change in the magnetic force strength measured by the first sensor between the external magnet and the magnetic spacer and to compensate the dilation based on the one of the temperature and strain.

12. The dilatometer of claim 11, wherein the external magnet is one of a spherical magnet, a hemispherical magnet, and a conical magnet.

13. The dilatometer of claim 11, wherein the sensor is a force sensor.

14. The dilatometer of claim 13, wherein the force sensor includes one of a load cell, a strain gauge, and a pressure sensor.

15. The dilatometer of claim 11, wherein the sensor and the external magnet are selected from a group consisting of a Hall sensor, a magnetoresistor, a fluxgate sensor, a super-conducting quantum interference device (SQUID) sensor, a resonant sensor, an induction magnetometer, a reed contact sensor, a Wiegand wire sensor, and a magnetic force sensor.

16. The dilatometer of claim 11, wherein the magnetic spacer includes a ferritic stainless steel magnet or a perma-nent magnet.

17. The dilatometer of claim 11, wherein the controller is configured to measure the dilation of the coin cell battery during at least one of charging and discharging of the coin cell battery.

\* \* \* \* \*